United States Patent [19]

Hamilton et al.

[11] Patent Number: 5,296,854
[45] Date of Patent: Mar. 22, 1994

[54] HELICOPTER VIRTUAL IMAGE DISPLAY SYSTEM INCORPORATING STRUCTURAL OUTLINES

[75] Inventors: Bruce E. Hamilton, Sandy Hook; Lorren Stiles, Roxbury; Howard P. Harper, Huntington, all of Conn.

[73] Assignee: United Technologies Corporation, Stratford, Conn.

[21] Appl. No.: 960,567

[22] Filed: Oct. 13, 1992

Related U.S. Application Data

[63] Continuation of Ser. No. 689,405, Apr. 22, 1991, abandoned.

[51] Int. Cl.⁵ ............................................. G01C 21/00
[52] U.S. Cl. ................................... 340/980; 340/973; 345/9
[58] Field of Search ............... 340/980, 705, 461, 971, 340/974, 975, 946, 973; 359/630; 362/62, 80.1; 73/178 H; 244/17.11

[56] References Cited

U.S. PATENT DOCUMENTS 4,028,725 6/1977 Lewis et al. ........................ 358/103
4,961,626 10/1990 Fournier, Jr. et al. ............. 340/705
5,072,218 12/1991 Spero et al. ......................... 340/980

FOREIGN PATENT DOCUMENTS 0330147 2/1989 European Pat. Off. ...... G01C 23/00
0330184 2/1989 European Pat. Off. ...... G02B 27/00
1527049 10/1978 United Kingdom ................ 340/980

*Primary Examiner*—Brent Swarthout
*Attorney, Agent, or Firm*—Terrance J. Radke

[57] ABSTRACT

A virtual image display system provides video displays based upon virtual images of the external world having synchronized structural outlines superimposed on the video displays to a pilot operating an aircraft such as a helicopter in non-visual flight conditions. The virtual image display system includes a virtual imaging subsystem for generating virtual images of the external world, a video display subsystem for generating video images based upon the virtual images and for displaying the video images for the pilot's viewing, a sensing means for providing signals corresponding to the spatial location and perspective of the video display subsystem, a map comprising structural outlines corresponding to structural members forming the canopy structure of the helicopter, and a computer subsystem providing electronic interfacing between the elements of the virtual image display system, for synchronizing the orientation of the virtual imaging subsystem with the video display subsystem, and for processing the virtual image signals to provide signals to the video display subsystem to generate video displays. The computer utilizes the helmet position signals to define the relative position and orientation of the video display subsystem in the cockpit, and utilizes such definition to reconstruct structural outlines from the map that are synchronized to the perspective of the video images. The synchronized structural images are superimposed upon the video display.

15 Claims, 6 Drawing Sheets

HELICOPTER VIRTUAL IMAGE DISPLAY SYSTEM INCORPORATING STRUCTURAL OUTLINES

RELATED APPLICATION

The present application is a continuation of U.S. patent application Ser. No. 07/689,405, filed Apr. 22, 1991, abandoned. The present application is related to U.S. Pat. No. 5,072,218 entitled CONTACT-ANALOG HEADUP DISPLAY METHOD AND APPARATUS, and U.S. patent application Ser. No. 07/160,059, filed Feb. 24, 1988, entitled AIRCRAFT HELMET POINTING ANGLE DISPLAY, now abandoned.

TECHNICAL FIELD

The present invention relates to aircraft display systems, and more particularly, to a virtual image display system that provides video displays based upon virtual images of the external world in combination with corresponding superimposed cockpit structural outlines to helmet mounted display subsystems for aircraft, particularly helicopters, operations during non-visual flight conditions such as night and/or adverse weather flight operations.

BACKGROUND OF THE INVENTION

Future generation aircraft (including helicopters) now in planning and/or development phases (as well as many present generation aircraft) are complex systems comprised of a large number of interrelated, complex subsystems such as the airframe, powerplant, flight controls, avionics, navigation equipment, armament, etc. Such subsystems generate significant amounts of status data, much of which must be frequently monitored by the pilot for the safe and/or efficient operation and/or pilotage of the aircraft. A considerable portion of pilot workload in these future generation aircraft will be devoted to monitoring the status of the aircraft subsystems during flight operations via reference to the generated status data.

In addition, mission requirements for such future generation aircraft may involve a greater percentage of high pilot workload flight operations such as hap-of-the-earth (NOE), adverse weather, and/or night flying. Such high pilot workload flight operations require the pilot to maintain a continual spatial awareness of aircraft orientation and/or location with respect to the external world and a situational awareness of objects of interest in the external world vis-a-vis the aircraft in addition to continual monitoring of the status of aircraft subsystems.

It will be appreciated that the task of monitoring the status of the various aircraft subsystems may conflict with the tasks of maintaining continual spatial and situational awareness of the external world. To monitor the status of aircraft subsystems, the pilot may have to divert his attention from the observation of the external world outside the cockpit to reference generated status data. Such diversions may lead to losses, in varying degrees, of spatial and/or situational awareness of the external world, which, in turn, may lead to less than optimal flight conditions, especially during high pilot workload flight operations.

Current aircraft design methodology strives to optimize the interrelationship between the functional task of monitoring aircraft status information and the functional tasks of maintaining continual spatial and situational awareness of the external world vis-a-vis the aircraft. Such design methodology seeks systems and methods that allow vital aircraft status information to be accessible to the pilot in such a manner that there is no interference with the continual spatial and situational awareness functions being performed by the pilot. In addition, such aircraft status information should be presented in a manner consonant with the spatial orientation and perspective of the pilot to preclude any decoupling among the various functional tasks. Such decoupling may lead to increased pilot workload (to maintain a viable frame of reference) and/or to pilot disorientation.

Electro-optical systems have been developed to provide aircraft status information to the pilot to facilitate simultaneous accomplishment of both the status monitoring functions and the spatial and situational awareness functions. These systems generate symbolic and digital status information images that correspond to the aircraft status information generated by the various aircraft subsystems and superimpose such symbolic status information images into the pilot's field of vision. The images are typically introduced into the pilot's field of vision by means of collimated light rays so that the symbolic images appear to be at optical infinity with respect to the pilot's visual system.

Thus, the pilot views the external world outside of the cockpit at infinity and simultaneously sees symbolic and digital images at infinity. The superimposition of two sets of images, i.e., the external world and electronically generated symbolic and digital status information images, enable the pilot to simultaneously maintain awareness of the status of the aircraft, the spatial orientation of the aircraft with respect to the external world, and a situational awareness of the external world vis-a-vis the aircraft.

Exemplary prior art electro-optical systems utilizing collimated light rays to generate symbolic images include head-up display (HUD) subsystems and helmet mounted display (HMD) subsystems. Representative examples of HUD and HMD subsystems are illustrated in U.S. Pat. Nos. 4,446,480, 4,439,775, 4,439,157, 4,305,057, 4,269,476, and 3,923,370. While such electro-optical systems have contributed significantly to the optimization of the interrelationship between the functional task of monitoring aircraft status information and the functional tasks of maintaining continual spatial and situational awareness of the external world vis-a-vis the aircraft during both visual and non-visual flight conditions, a problem has been identified that interferes with the functional tasks of maintaining spatial and situational awareness of the external world vis-a-vis the aircraft.

During visual flight conditions, the pilot utilizes a cognitive mechanism that allows the pilot to safely and efficiently maintain continual spatial and situational awareness of the external world vis-a-vis the aircraft. More specifically, the pilot, either consciously or subliminally, utilizes the canopy structure of the aircraft as a frame of reference to orientate his visual view of the external world vis-a-vis the aircraft. This cognitive mechanism precludes pilot disorientation during visual flight conditions inasmuch as the canopy structure provides an effective reference for maintaining spatial and situational awareness of the external world. A useful analogy would be the automobile driver who utilizes the hood and front bumpers of his automobile to maintain a continual spatial and situational awareness of the external world, i.e., the relationship of his automobile to the road, other traffic, pedestrians, etc.

During non-visual flight conditions such as night and/or adverse weather flight operations, a pilot cannot generally rely on the cognitive mechanism described in the preceding paragraphs. Many times the non-visual flight conditions are such that the pilot cannot visually perceive the canopy structure and/or the external world, and therefore cannot effectuate a referential relationship between the canopy structure and the external world to facilitate maintenance of spatial and situational awareness of the external world. Moreover, to an increasing degree, pilots operating an aircraft in non-visual flight conditions utilize virtual images of the external world, which are coupled into the pilot's field of view by means of the aforedescribed electro-optical systems, for pilotage of the aircraft.

Such virtual images may be generated by various sensor systems such as low-light television systems, infrared imaging systems, etc. A common characteristic of such virtual image generating systems is that the frame of reference of such generated virtual images of the external world is totally divorced from the canopy structure. For example, a virtual image generating system is typically located in the nose section or the forward belly section of an aircraft so as to generate virtual images of the aircraft's projected flight path. Such virtual images, especially where the aircraft is engaging in flight maneuvers other than straight and level flight, cannot be easily correlated to the canopy structure of the aircraft, which provides an essential underpinning for the utilization of the aforedescribed cognitive mechanism during flight operations.

As a result, pilots utilizing virtual images to pilot aircraft in non-visual flight conditions may become easily disorientated when engaging in flight maneuvers other than straight and level flight. Such disorientation adversely affects the safe pilotage of the aircraft, especially in high pilot workload flight conditions such as NOE flight operations. A need exists to provide pilots utilizing virtual images for non-visual flight conditions with an aircraft referent that will allow the pilot to utilize the cognitive mechanism that the pilot utilizes during visual flight conditions to maintain continual spatial and situational awareness of the external world vis-a-vis the aircraft during flight operations utilizing virtual images of the external world.

SUMMARY OF THE INVENTION

A primary object of the present invention is to provide a virtual image display system that provides video displays based upon virtual images of the external world in combination with superimposed cockpit structural outlines to a pilot via a helmet mounted display subsystem.

This object and other objects may be achieved by a virtual image display (VID) system according to the present invention for use in piloting aircraft, particularly helicopters, during non-visual flight conditions such as night and/or adverse weather flight operations. The VID system according to the present invention includes a primary processing, interface, and control means, a virtual imaging subsystem, a digitized map of the aircraft canopy structure, a video display subsystem, and a means for sensing the attitude and position of the video display subsystem with respect to a predetermined aircraft coordinate system.

The VID system according to the present invention is operative to provide continuous virtual images of the external world, to generate continuous video displays based upon these virtual images of the external world, and to transmit such video images to the pilot via the video display subsystem for use in piloting the aircraft during non-visual flight conditions such as night and/or adverse weather flight operations. The VID system is further operative to superimpose a synchronized portion of the structural outlines comprising the digitized map of the canopy structure upon the video images such that the pilot is provided with a cognitive video display orientated with respect to the helicopter canopy structure, thereby allowing the pilot to reference the video displays representative of the external world vis-a-vis corresponding aircraft canopy structure.

The VID system of the present invention has particular utility for use in helicopters during non-visual flight conditions such as night and/or adverse weather flight operations. The helicopter includes a movable virtual imaging subsystem and a cockpit having a predetermined canopy structure. The virtual imaging subsystem is operative to provide continuous virtual images of the external world during non-visual flight conditions, i.e., those flight conditions wherein the pilot's visual system is unable to comprehend the external world with sufficient clarity to ensure safe and/or efficient operation of the helicopter, e.g., during night and/or adverse weather flight operations. To generate virtual images of the external world during night flight operations, a forward looking infrared (FLIR) imaging subsystem may be utilized to generate continuous, high-definition virtual images of the external world during night flight operations. Other imaging systems such as low-light television systems, radar systems, or other sensors that are capable of generating high-definition virtual images of the external world may be utilized as the virtual imaging subsystem in the VID system according to the present invention. The virtual imaging subsystem is slaved to the video image display subsystem such that the FOV of the virtual imaging subsystem is movable with respect to the helicopter to align the FOV of the FLIR subsystem to coincide with the optical axis of the visual system of the pilot of the helicopter.

The video image display subsystem of the VID system is operative to position video images of the external world (derived from the virtual images captured by the virtual imaging subsystem) centered with respect to the optical axis of the visual system of the pilot, i.e., within the field of view of the pilot. The video image display subsystem may be a helmet mounted display (HMD) subsystem that includes a helmet and a visor type screen. The HMD subsystem is operative to project collimated video images, derived from virtual images provided by the virtual imaging subsystem, onto the pilot's visual system to provide a realistic, high-definition pictorial representation of the external world during non-visual flight conditions. or viewing by the pilot's visual system.

Associated with the helmet of the HMD subsystem is a sensing means that is operative to define the spatial position and angular orientation of the HMD subsystem within the cockpit of the helicopter. Position/orientation signals developed by the helmet sensing means are coupled to the primary processing, interface, and control means which is operative to process such signals to identify the position and angular orientation (perspective) of HMD subsystem in relation to the cockpit.

An imaginary reference point, designated as the "design eyepoint", is defined in the cockpit of the helicopter. The design eyepoint is a design parameter that defines the degree of visibility (unimpaired visual field of view of the external world) provided t the pilot of the helicopter based upon the structural configuration of the canopy structure.

The design eyepoint defines an origin of a coordinate system for the VID system of the present invention. To facilitate the identification and description of the spatial location and perspective of the HMD subsystem by means of the primary processing, interface, and control means, a polar coordinate system is utilized to define the spatial location and perspective of the HMD subsystem and to generate the digitized map of the canopy structure. Identifying the spatial location and perspective of the HMD subsystem is generally simplified by use of the polar coordinate system. As a general rule, once a pilot is properly positioned in the cockpit seat, the majority of head movements (which directly correspond to HMD subsystem movements) naturally made by the pilot during typical flight operations consist of head rotations about the vertical axis (left-right head turning movements), head rotations about the lateral axis (up-down head movements), or combinations thereof. The foregoing head movements define the spatial perspective of the HMD subsystem, i.e., the pointing angles of the optical axis of the pilot's visual system (which may be defined by the radius vector of the polar coordinate system), which may be described in terms of the polar coordinate system.

Translational movements may be accommodated and identified utilizing the processing capability of the primary processing, interface, and control means inasmuch as such movements involve computations based upon relatively straightforward geometric relationships. The initialized spatial location and perspective of the HMD subsystem is defined in terms of the design eyepoint and the optical axis of the pilot's visual system. The initialized spatial location of the HMD subsystem is defined as the design eyepoint, i.e., the origin of the polar coordinate system. The initialized spatial perspective of the HMD subsystem is defined so that the optical axis of the pilot's visual system is coaxial with the longitudinal axis passing through the design eyepoint and medially through the forward portion of the cockpit canopy. The helmet sensing means is initialized to the foregoing initialized spatial location and perspective of the HMD subsystem. Subsequent movements of the HMD subsystem are detected by the helmet sensing means, and defined and described in terms of the polar coordinate system utilizing the processing capability of the primary processing, interface, and control means.

The canopy structure typically includes a number of windshield posts, sideposts, and cockpit rails. Respective combinations of the windshield posts, sideposts, and cockpit rails define the viewing sectors of the canopy structure available to the pilot for visual observation of the external world. The windshield posts, sideposts, and cockpit rails occlude the pilot's visual observation of the external world during visual flight operations. As such, the pilot, either consciously or subliminally, references visual observations of the external world to such structural members as are interposed between the pilot and the external world. These structural members of the canopy structure are an integral element of the cognitive mechanism that allows the pilot to maintain spatial and situational awareness of the external world vis-a-vis the helicopter during visual flight operations.

The VID system of the present invention incorporates these structural members of the canopy structure into the virtual images that define the realistic, high-definition pictorial representation provided to the pilot during non-visual flight operations (via the FLIR subsystem and the HMD subsystem) so that the pilot may rely upon and utilize the same cognitive mechanism that is operative during visual flight operations during non-visual flight operations to maintain spatial and situational awareness of the external world vis-a-vis the helicopter. The digitized map is an interrelated series of structural outlines that correspond to the windshield posts, sideposts, and cockpit rails of the canopy structure. Structural outlines corresponding to the windshield posts, the sideposts, and the cockpit rails are generated by means of the polar coordinate system and stored in the digitized map.

The map is assembled in digitized form to facilitate storage of the map in a memory structure in the primary processing, interface, and control means. During reconstruction of the relevant structural outlines of the digitized map by the primary processing, interface, and control means for subsequent superimpositioning onto corresponding video images, the primary processing, interface, and control means is operative to interpolate between adjacent digital points defining the respective structural outlines so that the reconstructed structural outlines are provided as continuous structures.

The primary processing, interface, and control (PPIC) means of the VID system is a general purpose computer that includes a central processing unit, memory storage, input/output ports, and a control, address, data bus. The PPIC means is operative to provide electronic interfacing among the various subsystems comprising the VID system.

The PPIC means is operative to provide control signals to synchronize the spatial orientation of the virtual imaging subsystem with the perspective of the HMD subsystem, i.e., to align the FOV of the virtual imaging subsystem in correspondence to the optical axis of the pilot's visual system. These control signals are derived by the central processing unit based upon the position/orientation signals provided by the helmet sensing means.

The PPIC means is further operative to provide the necessary processing capability required by the VID system of the present invention. This processing capability includes processing the virtual image signals generated by the virtual imaging subsystem and providing corresponding signals to the HMD subsystem to generate corresponding video images. The PPIC means is also operative to define the spatial orientation and perspective of the HMD subsystem based upon position/orientation signals provided by the helmet sensing means.

The PPIC means is also operative to correlate the defined spatial orientation and perspective of the HMD subsystem to the canopy structure of the helicopter. Based upon the correlated spatial orientation and perspective of the HMD subsystem, the central processing unit reconstructs structural outlines of the relevant portion(s) of the canopy structure, utilizing the digitized map, to provide structural outlines that are synchronized with the virtual images generated by the virtual imaging subsystem. The central processing unit may be utilized to convert the synchronized structural outlines to a video format that is compatible with the video image generated by the HMD subsystem.

The PPIC means is further operative to combine the synchronized structural outlines onto corresponding video images in a predetermined manner. More specifically, the synchronized structural outlines are superimposed onto corresponding video images such that the structural outlines occlude corresponding portions of the underlying video image. However, due to the configuration (thickness) of the structural outlines, occlusion of the video images is minimized.

The combined video images present a pictorial representation of the external world that is viewed by the pilot by means of the HMD subsystem and utilized by the pilot to maintain spatial and situational awareness of the external world vis-a-vis the helicopter based upon the cognitive mechanism. The combined video image display presents elements of the external world that are within the FOV of the virtual imaging subsystem. Correlating the structural outlines of the video images of the external world provides the pilot with a spatial and situational awareness of the external world vis-a-vis the helicopter.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DETAILED DESCRIPTION OF PREFERRED EMBODIMENTS

Figure 1:
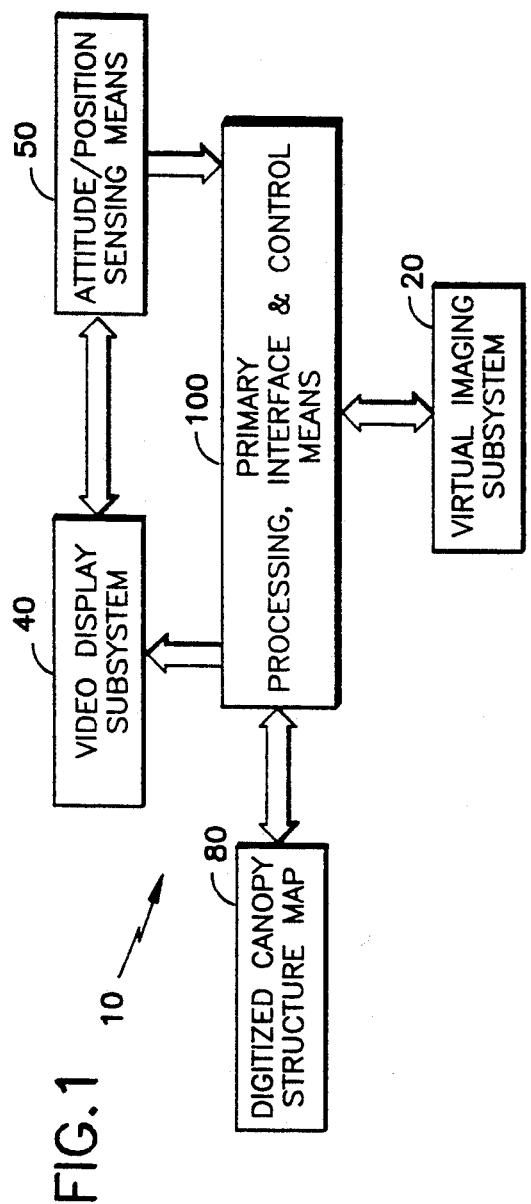
FIG. 1 is a schematic diagram of a virtual image display system incorporating structural outlines according to the present invention.

Referring now to the drawings where like reference numerals identify corresponding or similar elements throughout the several views, FIG. 1 is a diagrammatic illustration of a virtual image display (VID) system 1 according to the present invention for use in piloting aircraft, particularly helicopters, during non-visual flight conditions such as night and/or adverse weather flight operations. The VID system 10 according to the present invention includes a primary processing, interface, and control means 100, a virtual imaging subsystem 20, a digitized map 80 of the aircraft canopy structure 60 (see FIG. 2) a video display subsystem 40, and a means 50 for sensing the attitude and position of the video display subsystem 40 with respect to a predetermined aircraft coordinate system.

The VID system 10 according to the present invention is operative to provide continuous virtual images of the external world, to generate continuous video displays based upon these virtual images of the external world, and to transmit such video images to the pilot via the video display subsystem 40 for use in piloting the aircraft during non-visual flight conditions such as night and/or adverse weather flight operations. The VID system 10 is further operative to superimpose a synchronized portion of the digitized map 80 of the canopy structure 60 upon the video images such that the pilot is provided with a cognitive video display orientated with respect to the helicopter canopy structure 60, thereby allowing the pilot to reference the video displays representative of the external world vis-a-vis corresponding aircraft canopy structure 60.

As discussed hereinabove, a pilot either consciously or subliminally references visual images of the external world perceived by means of his visual system with corresponding parts of the aircraft canopy structure during visual flight operations. This cognitive mechanism allows the pilot to maintain spatial and situational awareness of the external world vis-a-vis the aircraft. The VID system 10 of the present invention is thus operative to provide the pilot with a cockpit referenced view of the external world during non-visual flight conditions that is functionally and structurally equivalent to the pilot's view of the external world during visual flight conditions such that the cognitive mechanism that operates during visual flight conditions may be utilized by the pilot during non-visual flight conditions to maintain spatial and situational awareness of the external world vis-a-vis the aircraft. The VID system 10 of the present invention precludes pilot disorientation during non-visual flight conditions, especially during flight conditions wherein the corresponding aircraft canopy structure 60 cannot be perceived by the pilot using his visual system.

The VID system 10 of the present invention has particular utility for use in helicopters during non-visual flight conditions such as night and/or adverse weather flight operations. One such helicopter H is exemplarily illustrated in FIG. 2, which depicts the RAH-66 Comanche light helicopter. The RAH-66 helicopter H includes a transparent nose section NS that houses a gimballed virtual imaging subsystem 20 and a cockpit CP having a predetermined canopy structure 60, as described in further detail hereinbelow. While the VID system 10 of the present invention is described hereinbelow in terms of the structure and configuration of the RAH-66 helicopter, it is to be understood that the VID system 10 of the present invention may be utilized in other helicopters and/or aircraft for non-visual flight operations.

The virtual imaging subsystem 20 is operative to provide continuous virtual images of the external world during non-visual flight conditions, i.e., those flight conditions wherein the pilot's visual system is unable to comprehend the external world with sufficient clarity to ensure safe and/or efficient operation of the helicopter H, e.g., during night and/or adverse weather flight operations. The term virtual images as used herein defines a realistic, high-definition pictorial representation of the external world that corresponds in structural definition to the same external world if viewed by the human visual system, e.g., a tree or building is recognizable as a tree or building.

The operating characteristics and capabilities of virtual imaging subsystems 20 of the type having utility in the VID system 10 of the present invention are well known to those skilled in the art. For example, to generate virtual images of the external world during night flight operations, a forward looking infrared (FLIR) imaging subsystem 20 is the preferred means, based upon the state of present day technology, of generating continuous, high-definition virtual images of the external world during night flight operations. The FLIR imaging subsystem 20 senses differences in thermal radiation emitted by the various elements of the external world within the field of view (FOV) of the FLIR sensors and generates signals representative of detected thermal radiation differences that are subsequently processed (see disclosure hereinbelow re the primary processing, interface, and control means 100) to provide continuous, high-definition virtual images of the external world within the FOV of the FLIR imaging subsystem 20. The FLIR imaging subsystem 20 may be selectively operated to generate hot and cold thermally differentiated images as black and white contrasts or vice versa, depending upon such factors as flight conditions, mission requirements, etc.

Other imaging systems such as low-light television systems, radar systems, or other sensors that are capable of generating high-definition virtual images of the external world may be utilized as the virtual imaging subsystem 20 in the VID system 10 according to the present invention. As discussed hereinbelow in further detail, the virtual imaging subsystem 20 is slaved to the video image display subsystem 40 such that the FOV of the virtual imaging subsystem 20 is movably gimballed within the transparent nose structure NS of the helicopter H to align the FOV of the FLIR subsystem 20 to coincide with the optical axis of the visual system of the pilot of the helicopter H.

Figure 3:
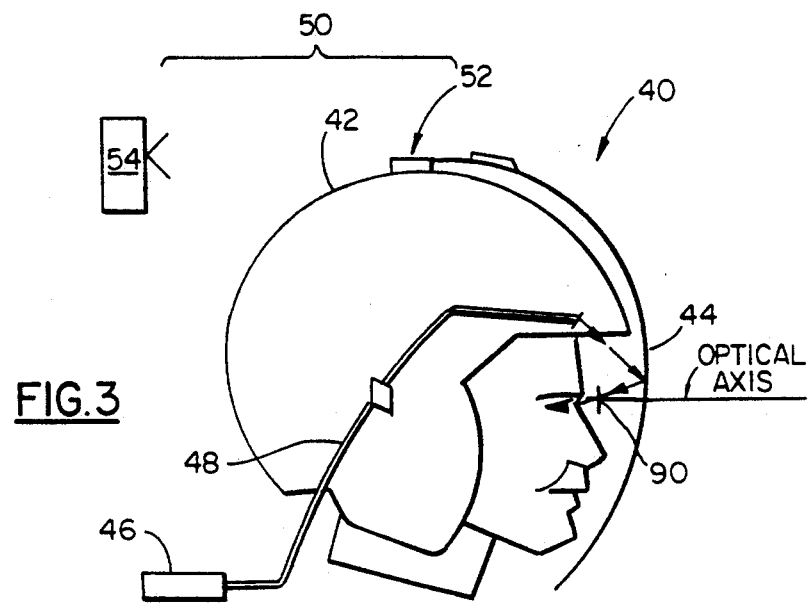
FIG. 3 is a plan view of a helmet mounted display subsystem having utility in the virtual image display system of the present invention.

The video image display subsystem 40 of the VID system 10 is operative to position video images of the external world (derived from the virtual images captured by the virtual imaging subsystem 20) centered with respect to the optical axis of the visual system of the pilot, i.e., within the field of view of the pilot. With reference to FIG. 3, the preferred video image display subsystem 40 is a helmet mounted display (HMD) subsystem that includes a helmet 42 and a visor type screen 44. The screen 44 may be fabricated as a reflective part of the optical train by utilizing a screen material that is partially reflective so that the screen 44 is operative to focus and project collimated video images onto the visual system of the pilot. Concomitantly, the screen 44 may be fabricated to be partially transparent to visible light radiation from the external world. The screen 44 is thus simultaneously operative to facilitate viewing of the external world (and the canopy structure 60) via the pilot's visual system during visual flight conditions and to project collimated video images, derived from virtual images provided by the virtual imaging subsystem 20, onto the pilot's visual system that provide a realistic, high-definition pictorial representation of the external world during non-visual flight conditions. The video images viewed by the pilot appear to be located at infinity due to the collimation of the video images.

The visor type screen 44 may be removably attached to the helmet 42 so that the screen 44 may be removed for visual flight operations if desired. The screen 44 may be fabricated with a defined curved configuration to provide a 30°×60° degree panoramic field of view of the external world to the pilot (vertically and laterally, respectively, with respect to the optical axis of the pilot's visual system which is defined as a straight line projecting outwardly from the pilot's head from a point midway between his eyes).

The HMD subsystem 40 may be binocular and may include dual miniaturized cathode ray tubes (CRTs) 46 such as those manufactured by Thomas Electronics, Hughes Aircraft, or AT&T Bell Laboratories, that receive image signals from the primary processing, interface, and control means 100 and which are operative to generate high-definition video images therefrom. A one-inch diameter CRT 46 may provide 1200 video lines, i.e., a 1200×1200 pixel matrix. Associated with each CRT 46 is a collimating optical train 48 that provides the optical interface between the CRTs 46 and the screen 44 for the high-definition video images, the optical train 48 being operative to magnify and collimate the video images generated by the CRTs 46 for projection of video images onto the screen 44 for viewing by the pilot's visual system. The HMD subsystem 40 may be operative to generate overlapping video images such that the pilot perceives a unitary, panoramic, high-definition video pictorial representation of the external world via the screen 44. HMD subsystems 40 having utility in the VID system 10 of the present invention are generally known to those skilled in the art. A representative example of a HMD subsystem is described in U.S. Pat. No. 28,847.

Associated with the helmet 42 of the HMD subsystem 40 is a sensing means 50 that is operative to define the spatial position and angular orientation of the HMD subsystem 40 within the cockpit CP of the helicopter H. As exemplarily illustrated in FIG. 3, the helmet sensing means 50 comprises a sensor 52 mounted in combination with the helmet 42 and an electromagnetic radiator 54 mounted in the cockpit CP adjacent the helmet 42. The sensor 52 is responsive to constant field strength electromagnetic radiation emitted by the electromagnetic radiator 54 to generate position/orientation signals, corresponding to the position and angular orientation of the HMD subsystem 40 in the cockpit CP, based upon the field strength and phase of the intercepted electromagnetic radiation. These position/orientation signals are coupled to the primary processing, interface, and control means 100 which is operative to process such signals to identify the position and angular orientation (perspective) of HMD subsystem 40 in relation to the cockpit CP. Helmet sensing means 50 having utility in the VID system 10 of the present invention are generally known to those skilled in the art, such sensing means being exemplarily illustrated by the three-axis Polhemus systems that provide signals indicative of the angular orientation of the helmet 42 in three axes as described in U.S. Pat. Nos. 4,017,858 and 3,983,474.

Figure 2:
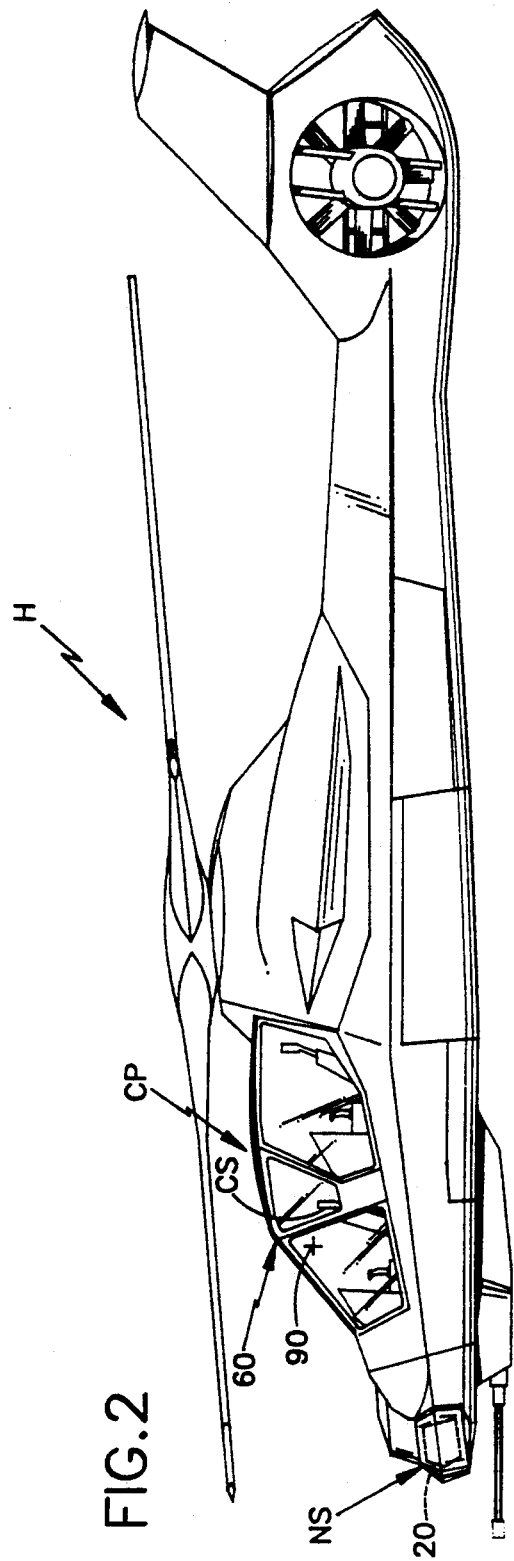
FIG. 2 is a plan view of a helicopter in which the virtual image display system of the present invention may be used.

An imaginary reference point 90, designated as the "design eyepoint", is defined in the cockpit CP of the helicopter H as illustrated in FIG. 2 (imaginary in sense that the design eyepoint 90 does not coincide with any structural elements or equipment comprising the canopy structure 60). The design eyepoint 90 is a design parameter that defines the degree of visibility (unimpaired visual field of view of the external world) provided to the pilot of the helicopter H based upon the structural configuration of the canopy structure 60. By way of example, for military helicopters having a single/tandem cockpit configuration, MIL-STD-850B sets forth suggested visibility requirements for the canopy structure.

For flight operations, the pilot positions himself in the cockpit seat CS (see FIG. 2) and adjusts the cockpit seat CS so that the origin of the optical axis of his visual system coincides with the design eyepoint 90 as illustrated in FIG. 3. To facilitate this alignment process, the RAH-66 helicopter H includes a boresight reticle unit mounted on the cockpit dashboard (coincident with the medial plane of the cockpit) and positioned so that, when activated, collimated light is emitted that passes through the design eyepoint 90. Only when the pilot is properly positioned in the cockpit CP, i.e., the origin of the optical axis of his visual system is coincident with the design eyepoint 90, will this collimated light be perceptible to the pilot's visual system.

Figure 4A:
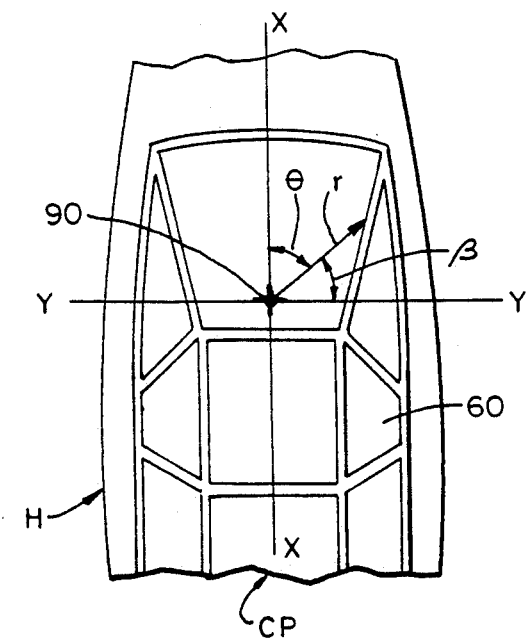
FIGS. 4A, 4B illustrate a polar coordinate system as a reference system for the virtual image display system of the present invention.
Figure 4B:
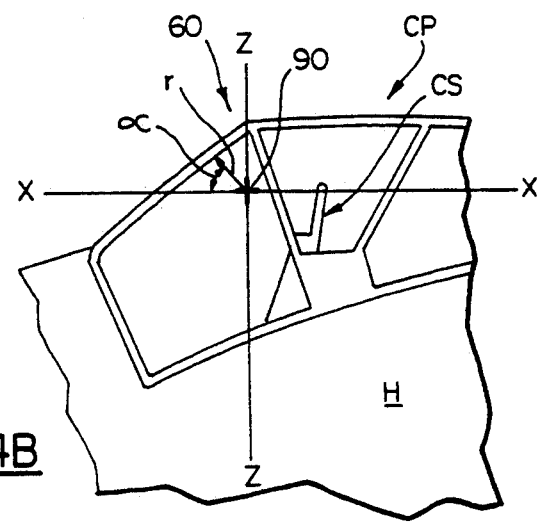

The design eyepoint 90 defines an origin (0, 0, 0) of a coordinate system for the VID system 10 of the present invention. To facilitate the identification and description of the spatial location and perspective of the HMD subsystem 40 by means of the primary processing, interface, and control means 100, a polar coordinate system $(r, \Theta, \beta, \alpha)$, as exemplarily illustrated in the plan views of FIGS. 4A, 4B, which are overlaid on the corresponding cockpit configuration of the helicopter H, is utilized to define the spatial location and perspective of the HMD subsystem 40 and to generate the digitized map 80 of the canopy structure 60, as discussed in further detail hereinbelow. Also illustrated in FIGS. 4A, 4B is the three axes coordinate system generally used for helicopter descriptive purposes, i.e., the longitudinal axis X—X, the transverse axis Y—Y, and the vertical axis Z—Z. As described hereinbelow in further detail, the polar coordinate system may be used to define any point (x, y, z) of the canopy structure 60 by means of the transformation equations:

$$x = r(\cos \theta)$$

$$y = r(\cos \beta)$$

$$z = r(\cos \alpha)$$

$$r^2 = x^2 + y^2 + z^2$$

Identifying the spatial location and perspective of the HMD subsystem 40 is generally simplified by use of the polar coordinate system. As a general rule, once a pilot is properly positioned in the cockpit seat CS, as described hereinabove, the majority of head movements (which directly correspond to HMD subsystem 40 movements) naturally made by the pilot during typical flight operations consist of head rotations about the vertical axis Z—Z (left-right head turning movements), head rotations about the lateral axis Y—Y (up-down head movements), or combinations thereof. The foregoing head movements define the spatial perspective of the HMD subsystem 40, i.e., the pointing angles of the optical axis of the pilot's visual system (which may be defined by the radius vector r of the polar coordinate system), which may be described in terms of the angle $\theta$, the angle $\alpha$, or combinations thereof, respectively, of the polar coordinate system.

Experience has shown that there will be relatively little translational movement of the pilot's head along the longitudinal, lateral, and/or vertical axes during normal flight operations. Pragmatically, therefore, the HMD subsystem 40 may be defined as having a constant spatial location coincident with the origin of the polar coordinate system. Even if the HMD subsystem 40 is subjected to translational movements, such movements may be accommodated and identified utilizing the processing capability of the primary processing, interface, and control means 100 inasmuch as such movements involve computations based upon relatively straightforward geometric relationships.

The initialized spatial location and perspective of the HMD subsystem 40 is defined in terms of the design eyepoint 90 and the optical axis of the pilot's visual system. The initialized spatial location of the HMD subsystem 40 is defined as the design eyepoint 90, i.e., the origin of the polar coordinate system. The initialized spatial perspective of the HMD subsystem 40 is defined so that the optical axis of the pilot's visual system is coaxial with the longitudinal axis X—X passing through the design eyepoint 90 and medially through the forward portion of the cockpit CP canopy. The helmet sensing means 50 is initialized to the foregoing initialized spatial location and perspective of the HMD subsystem 40. Subsequent movements of the HMD subsystem 40 are detected by the helmet sensing means 50, and defined and described in terms of the direction angles $\theta$, $\alpha$ (or the radius vector r and the direction angle $\beta$, as required) utilizing the processing capability of the primary processing, interface, and control means 100.

Figure 5A:
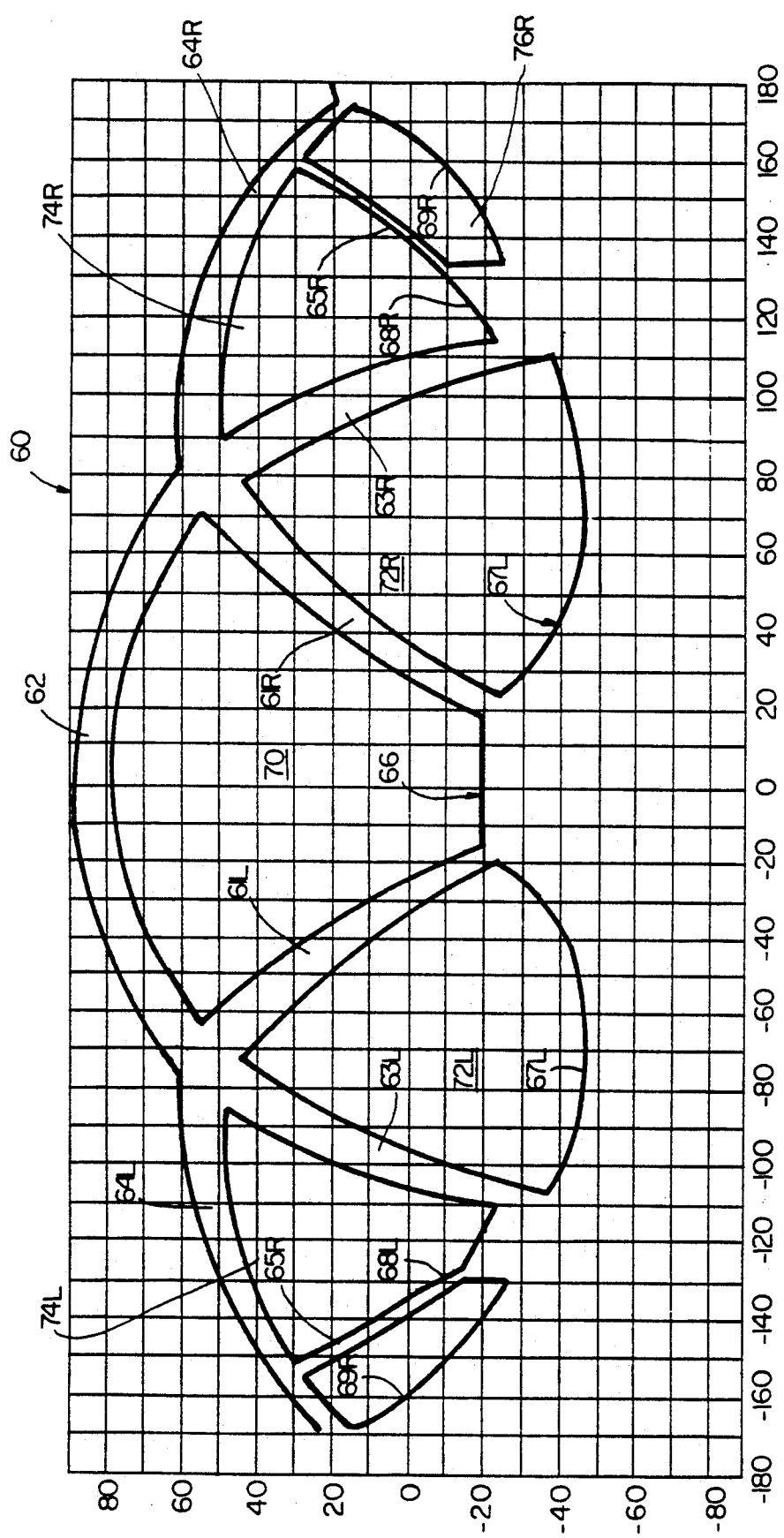
FIG. 5A is a rectilinear plot of the canopy structure of the helicopter of FIG. 2.

FIG. 5A is a rectilinear plot of the canopy structure 60 of the helicopter H illustrated in FIG. 2. The rectilinear plot was derived based upon the design eyepoint 90 and the polar coordinate system described hereinabove. The abscissa represents the direction angle $\theta$ and the ordinate represents the direction angle $\alpha$. The canopy structure 60 includes left and right windshield posts 61L, 61R, a transverse post 62, left and right forward sideposts 63L, 63R, left and right rear sideposts 64L, 64R, left and right secondary sideposts 65L, 65R, a forward cockpit rail 66, left and right primary cockpit rails 67L, 67R, left and right secondary cockpit rails 68L, 68R, and left and right tertiary cockpit rails 69L, 69R.

The foregoing structural members comprising the canopy structure 60 in respective combinations define the viewing sectors of the canopy structure 60 available to the pilot for visual observation of the external world. These may be defined as the forward canopy 70, the left and right primary side canopies 72L, 72R, the left and right secondary side canopies 74L, 74R, and the left and right tertiary side canopies 76L, 76R as illustrated in FIG. 5A. The various canopies described above are fabricated from an optically transparent material such that visible light radiation from the external world is transmitted therethrough to the visual system of the pilot. The canopy members are not relevant to the VID system 10 of the present invention inasmuch as these members are effectively transparent to the pilot's visual system, and as such, do not function as reference points for visual observations of the external world by the pilot during visual flight operations, and therefore, are not part of the pilot's cognitive mechanism for maintaining spatial and situational awareness of the external world vis-a-vis the helicopter H.

In contrast, the structural posts and rail members of the canopy structure 60 occlude the pilot's visual observation of the external world during visual flight operations. As such, the pilot, either consciously or subliminally, references visual observations of the external world to respective structural posts and rail members that are interposed between the pilot and the external world. The structural posts and rail members of the canopy structure 60 as described hereinabove are an integral element of the cognitive mechanism that allows the pilot to maintain spatial and situational awareness of the external world vis-a-vis the helicopter H during visual flight operations.

Therefore, the VID system 10 of the present invention incorporates these elements of the canopy structure 60 into the virtual images that define the realistic, high-definition pictorial representation provided to the pilot during non-visual flight operations (via the FLIR subsystem 20 and the HMD subsystem 40) so that the pilot may rely upon and utilize the same cognitive mechanism that is operative during visual flight operations during non-visual flight operations to maintain spatial and situational awareness of the external world vis-a-vis the helicopter H.

Figure 5B:
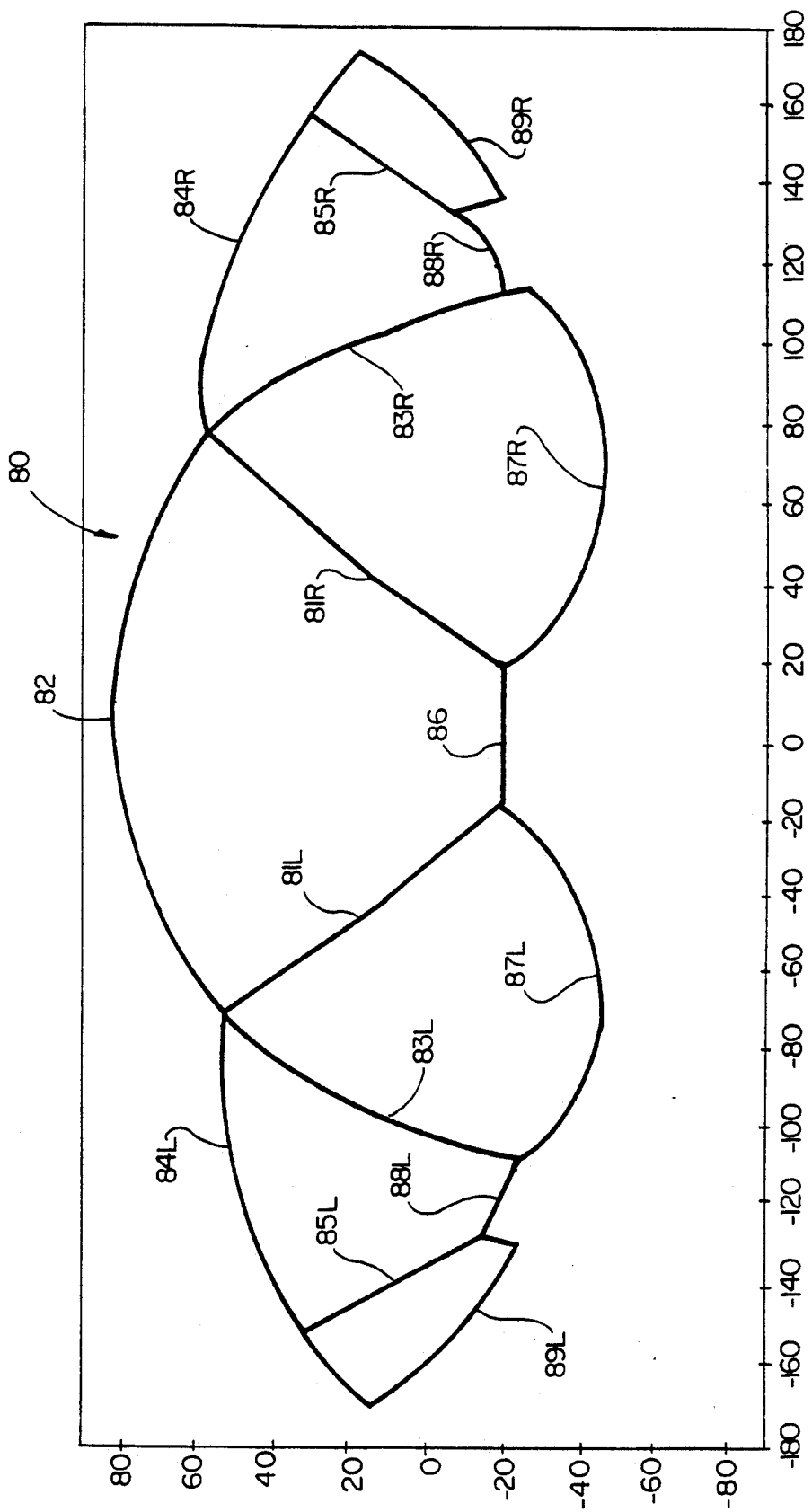
FIG. 5B is a rectilinear plot illustrating a digitized map representing the optically opaque structural outlines corresponding to the canopy structure of FIG. 5A.

FIG. 5B is a to-scale rectilinear digitized map 80 corresponding to the canopy structure 60 illustrated in FIG. 5B and described hereinabove. The digitized map 80 is an interrelated series of structural outlines that correspond to the structural posts and rails of the canopy structure 60 as described hereinabove. Structural outlines 81L, 81R correspond to the left and right windshield posts 61L, 61R, respectively, structural outline 82 corresponds to the transverse post 62, structural outlines 83L, 83R correspond to the left and right forward sideposts 63L, 63R, respectively, structural outlines 84L, 84R correspond to the left and right rear sideposts 64L, 64R, respectively, structural outlines 85L, 85R correspond to the left and right secondary sideposts 65L, 65R, respectively, structural outline 86 corresponds to the forward cockpit rail 66, structural outlines 87L, 87R correspond to the left and right primary cockpit rails 67L, 67R, respectively, structural outlines 88L, 88R correspond to the left and right secondary cockpit rails 68L, 68R, respectively, and structural outlines 89L, 89R correspond to the left and right tertiary cockpit rails 69L, 69R.

The digitized map 80 may be formed by utilizing the polar coordinate system described hereinabove to define digitized structural outline sequences (based upon digital points defined and identified by the polar coordinate system) corresponding to each of the posts and rails comprising the canopy structure 60. The map 80 is assembled in digitized form to facilitate storage of the map 80 in a memory structure in the primary processing, interface, and control means 100. During reconstruction of the relevant structural outlines of the digitized map 80 by the primary processing, interface, and control means 100 for subsequent superimpositioning onto corresponding video images, the primary processing, interface, and control means 100 is operative to interpolate between adjacent digital points defining the respective structural outlines so that the reconstructed structural outlines are provided as continuous structures. The primary processing, interface, and control means 100 may be further operative to vary the thickness of the structural outlines, as required.

Figure 6:
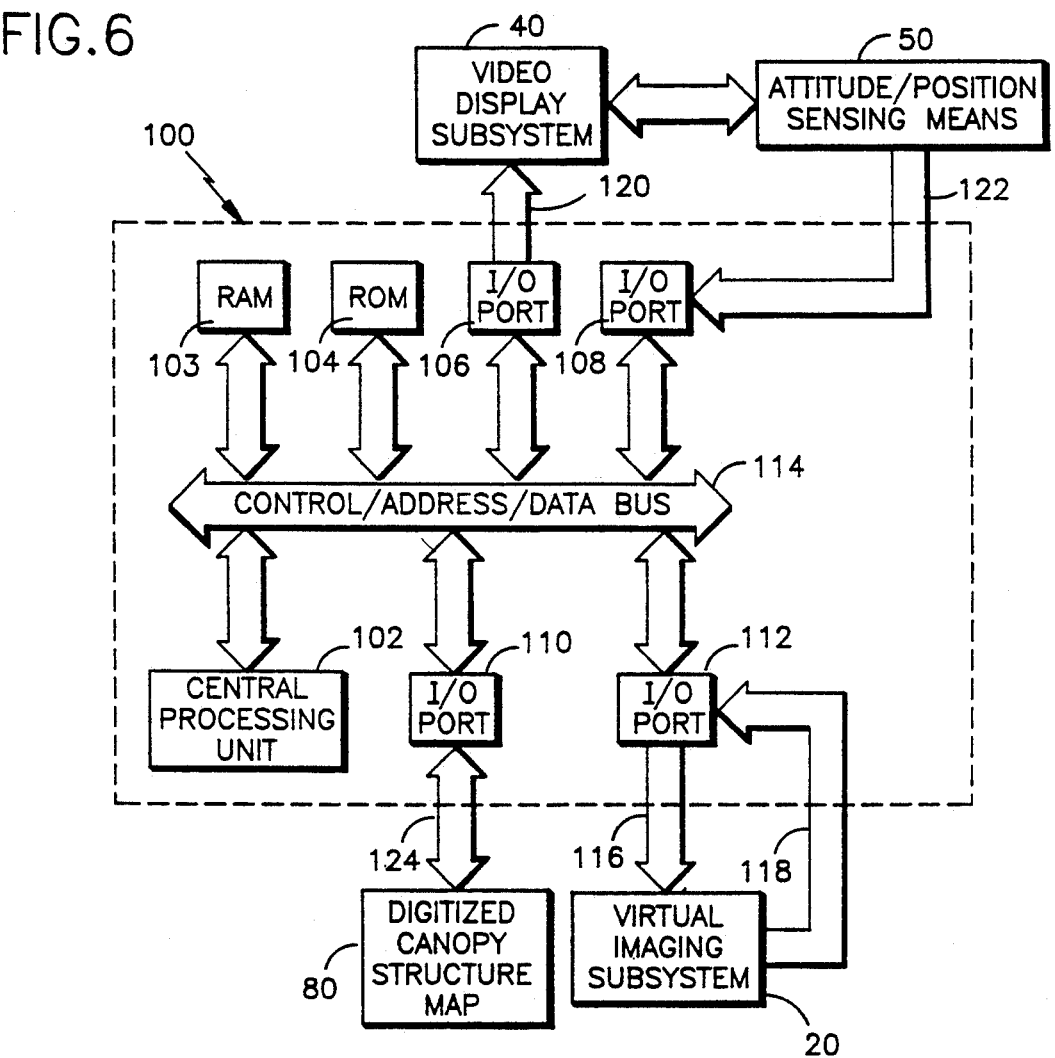
FIG. 6 is a schematic view of a primary processing, interface, and control means for the virtual image display system of FIG. 1.

The primary processing, interface, and control (PPIC) means 100 of the VID system 10 is exemplarily illustrated in further detail in FIG. 6. The PPIC means 100 exemplarily illustrated includes a central processing unit 102, a random access memory (RAM) 103, a read only memory (ROM) 104, input/output ports 106, 108, 110, 112, and a control, address, data bus 114. The PPIC means 100 is illustrated in generalized form as a general purpose computer that may take on forms different than that specifically illustrated.

The computer architecture may be of the split processor type having more than one control, address, data bus. One bus may be dedicated to input/output tasks and communication functions. Another separate bus may be dedicated to image processing, definition functions, and map line reconstruction and conversion to video format. For architecture employing more than a single bus, each bus would typically have a processor such as a Motorola 80286 type processor associated therewith. The PPIC means 100 may be implemented in the form of Very High-Speed Integrated Circuitry (VHSIC) with 1.25 microns between geometric features. Such a PPIC means 100 may have more than 13 megabytes of internal memory, and the capability of executing 19 million instructions per second and 300+ million operations per second.

The PPIC means 100 is operative to provide electronic interfacing among the various subsystems comprising the VID system 10 as described hereinabove, via signal lines 116, 118, 120, 122, 124, respectively. Interactive coupling between the HMD subsystem 40 and the helmet sensing means 50 is identified by reference numeral 130.

The PPIC means 100 is operative to provide control signals via signal line 116 to synchronize the spatial orientation of the virtual imaging subsystem 20 with the perspective of the HMD subsystem 40, i.e., to align the FOV of the virtual imaging subsystem 20 in correspondence to the optical axis of the pilot's visual system. These control signals are derived by central processing unit 102 based upon the position/orientation signals provided by the helmet sensing means 50 via signal line 122.

The PPIC means 100 is further operative to provide the necessary processing capability required by the VID system 10 of the present invention. This processing capability includes processing the virtual image signals generated by the virtual imaging subsystem 20 and inputted via signal line 118 to provide corresponding signals to the HMD subsystem 40, via signal line 120, for generation of video images corresponding to the virtual image. The PPIC means 100 is also operative to define the spatial orientation and perspective of the HMD subsystem 40 based upon position/orientation signals provided by the helmet sensing means 50 via signal line 122.

The PPIC means 100 is also operative to correlate the defined spatial orientation and perspective of the HMD subsystem 40 to the canopy structure 60 of the helicopter H by means of the central processing unit 102. Based upon the correlated spatial orientation and perspective of the HMD subsystem 40, the central processing unit 10 reconstructs structural outlines of the relevant portion(s) of the canopy structure 60, utilizing the digitized map 80, to provide structural outlines that are synchronized with the virtual images generated by the virtual imaging subsystem 20. The central processing unit 102 may be utilized to convert the synchronized structural outlines to a video format that is compatible with the video image generated by the HMD subsystem.

The PPIC means 100 is further operative to combine the synchronized structural outlines onto corresponding video images in a predetermined manner via signal line 120. More specifically, the synchronized structural outlines are superimposed onto corresponding video images such that the structural outlines occlude corresponding portions of the underlying video image. However, due to the configuration (thickness) of the structural outlines, occlusion of the video images is minimized.

Figure 7:
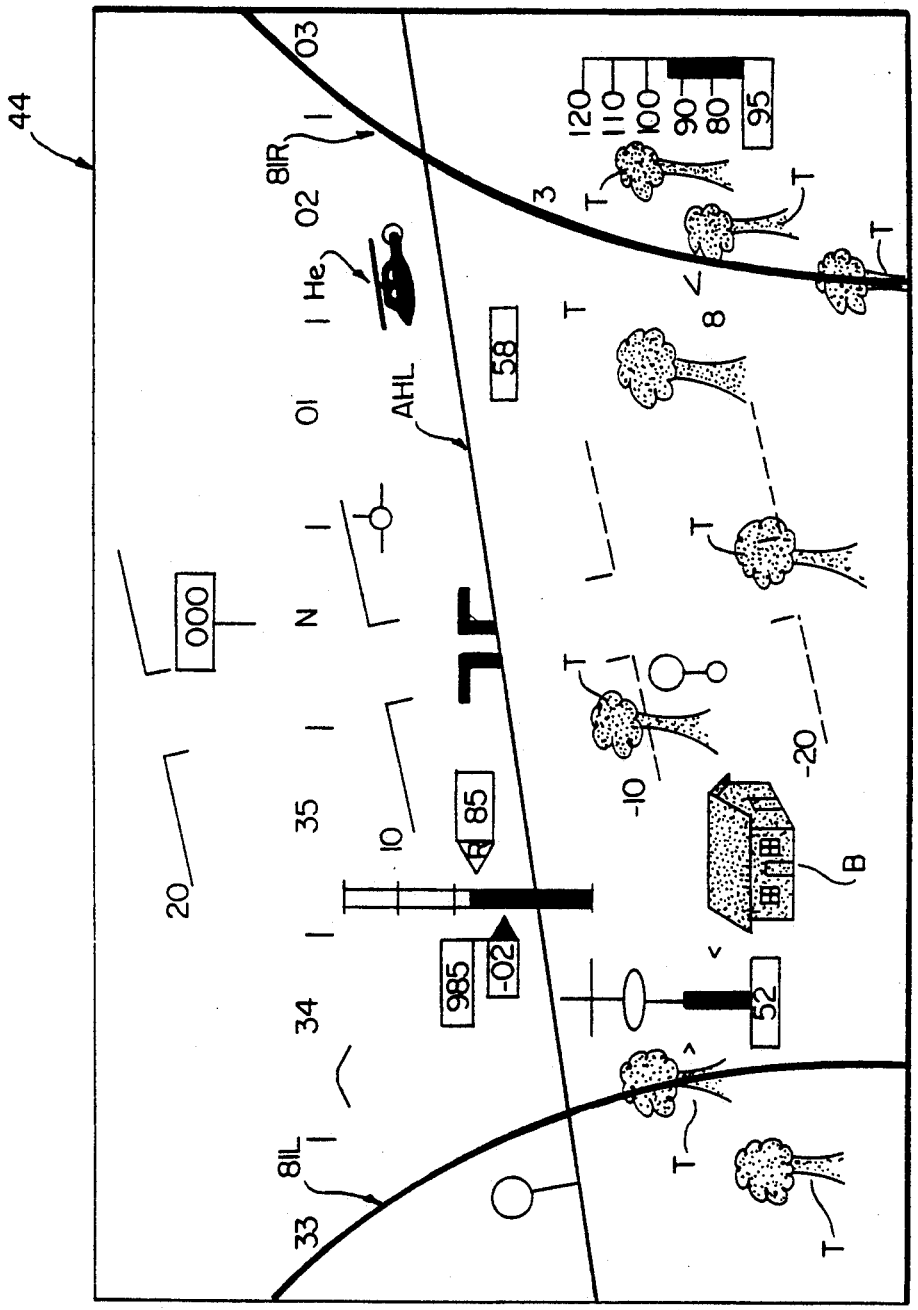
FIG. 7 is a plan view of optically opaque structural outlines superimposed onto a video display of a virtual image of the external world.

FIG. 7 is a pictorial representation of an instantaneous combined video image generated by means of the VID system 10 of the present invention. This pictorial representation is viewed by the pilot by means of the HMD subsystem 40 and utilized by the pilot to maintain spatial and situational awareness of the external world vis-a-vis the helicopter H based upon the cognitive mechanism described hereinabove. The pictorial representation of FIG. 7 illustrates structural outlines 81L, 81R, corresponding to the left and right windshield posts 61L, 61R of the helicopter H, superimposed upon a video image generated by the HMD subsystem 40 which was derived from a virtual image provided by the virtual imaging subsystem 20. The video image displays elements of the external world such as a helicopter He in flight, trees T, and a building B that are within the FOV of the virtual imaging subsystem 20. Other symbology illustrated in FIG. 7 is representative of aircraft status information that is not pertinent to the present invention. The symbol identified by the reference letters AHL is an artificial horizon line corresponding to the horizon line of the external world.

With respect to FIG. 7, the structural outlines 81L, 81R apprise the pilot that the displayed pictorial representation is being viewed through the forward canopy 70 of the helicopter H. Correlating the structural outlines 81L, 81R with the artificial horizon line AHL apprises the pilot that the helicopter H is being flown in a shallow bank to the left. This information provides the pilot with spatial awareness of the relationship between the helicopter H and the external world utilizing the cognitive mechanism described hereinabove.

Correlating the structural outlines 81L, 81R with the pictorial display of the helicopter He apprises the pilot that the helicopter He may be on a flight path that will intersect the pilot's course. The trees T and building B apprise the pilot of the proximity of the helicopter H that may present hazards to forward flight. This information provides the pilot with situational awareness of the relationship between the helicopter H and the external world utilizing the cognitive mechanism.

A variety of modifications and variations of the present invention are possible in light of the above teachings. It is therefore to be understood that, within the scope of the appended claims, the present invention may be practiced otherwise than as specifically described hereinabove.

What is claimed is:

1. A virtual image display system for use by a pilot in an aircraft having a canopy structure of predetermined configuration, comprising:

virtual imaging means for generating virtual images of the external world;

video display means for generating and displaying video images based upon said virtual images of the external world for viewing by the pilot.

sensing means disposed in interactive relation with said video display means for generating position signals corresponding to the spatial location and perspective of said video display means;

map means for storing structural outlines corresponding to the predetermined configuration of the canopy structure; and computer processing means for defining the spatial location and perspective of said video display means based upon said position signals generated by said sensing means;

said computer processing means being further operative for reconstructing structural outlines of segments of the canopy structure from said stored structural outlines of said map means, said reconstructed structural outline segments being based upon and synchronized with said defined spatial location and perspective of said video display means;

said computer processing means being further operative to superimpose said reconstructed structural outline segments onto said displayed video images to provide the pilot with a high-definition pictorial representation of the external world wherein said superimposed, reconstructed structural outline segments occlude corresponding segments of said displayed video images such that said superimposed, reconstructed structural outline segments provide the pilot with a referential framework during viewing of said occluded displayed video images.

2. The virtual image display system of claim 1 where said computer processing means is further operative, in response to said position signals generated by said sensing means, to generate control signals to synchronize said virtual imaging means to said defined spatial location and perspective of said video display means.

3. The virtual image display system of claim 1 wherein said stored structural outlines of said map means are in digitized form.

4. The virtual image display system of claim 3 wherein said computer processing means is operative to interpolate between adjacent digital points of said stored digitalized structural outlines wherein said reconstructed structural outline segments are provided as continuous images.

5. The virtual image display system of claim 1 wherein the canopy structure is formed from structural posts and rails and wherein said stored structural outline segments correspond to the structural posts and rails forming the canopy structure.

6. The virtual image display system of claim 5 wherein said reconstructed structural outline segments comprise segments of the structural posts and rails based upon and synchronized with said defined spatial location and perspective of said video display means.

7. The virtual image display system of claim 1 wherein said computer processing means includes a memory structure, and wherein said map means is said memory structure.

8. The virtual image display system of claim 1 wherein said virtual imaging means is a forward looking infrared imaging subsystem.

9. The virtual image display system of claim 1 wherein said virtual imaging means is a low-light television subsystem.

10. The virtual image display system of claim 1 wherein said virtual imaging means is a radar subsystem.

11. The virtual image display system of claim 1 wherein said video display system is a helmet mounted display subsystem.

12. The virtual image display system of claim 1 wherein said sensing means is a three-axis Polhemus system.

13. A virtual image display system for use by a pilot in an aircraft having a canopy structure including a plurality of posts and rails, comprising:

- a forward looking infrared imaging subsystem for generating virtual image signals corresponding to the external world within the field of view thereof;
- a helmet mounted display subsystem worn by the pilot;
- sensing means disposed in interactive relation with said helmet mounted display system for generating position signals corresponding to the spatial location and perspective of said helmet mounted display system with respect to the plurality of posts and rails forming the canopy structure; and
- computer processing means being operative in response to said position signals for defining the spatial location and perspective of said helmet mounted display subsystem worn by the pilot;
- said computer processing means being further operative to process said virtual image signals to provide corresponding signals to said helmet mounted display subsystem to generate and display video images for viewing by the pilot, said displayed video images being based upon and synchronized with said defined spatial location and perspective of said helmet mounted display subsystem;
- said computer processing means including a memory structure having stored therein a digitized map defining an interrelated series of structural outlines corresponding to the plurality of posts and rails forming the canopy structure;
- said computer processing means being further operative to reconstruct structural outlines of segments of the plurality of posts and rails from said digitized map based upon and synchronized in perspective with said defined spatial location and perspective of said helmet mounted display subsystem;
- said computer processing means being further operative to superimpose said reconstructed structural outline segments onto said displayed video images viewed by the pilot such that said reconstructed structural outline segments occlude corresponding portions of said displayed video images, said superimposed reconstructed structural outline segments providing the pilot with a referential framework during view of said occluded displayed video images.

14. The virtual image display system of claim 13 wherein said computer processing means is operative to interpolate between adjacent digital points of said stored digitalized structural outlines wherein said reconstructed structural outline segments are provided as continuous images.

15. The virtual image display system of claim 13 wherein said computer processing means is further operative, in response to said position signals generated by said sensing means, to generate control signals to synchronize the field of view of said forward looking infrared imaging subsystem to align with said defined spatial location and perspective of said helmet mounted display subsystem.

* * * * *

UNITED STATES PATENT AND TRADEMARK OFFICE
CERTIFICATE OF CORRECTION

PATENT NO. : 5,296,854

DATED : March 22, 1994

INVENTOR(S) : Bruce E. Hamilton et al.

It is certified that error appears in the above-identified patent and that said Letters Patent is hereby corrected as shown below:

Title Page: Item ]75] After "Howard P. Harper, Huntington, and Before "all of Conn." Insert -- Robert C. Kass, West Redding --

Column 5, line 5, "t" should read --to--

Signed and Sealed this

Twelfth Day of July, 1994

Attest:

BRUCE LEHMAN

Attesting Officer

Commissioner of Patents and Trademarks